(12) United States Patent
Turek et al.

(10) Patent No.: US 11,732,813 B2
(45) Date of Patent: Aug. 22, 2023

(54) BALL VALVE ASSEMBLY

(71) Applicant: Goodrich Corporation, Charlotte, NC (US)

(72) Inventors: Lukasz Turek, Wroclaw (PL); Dariusz Sapija, Jelcz-Laskowice (PL); Mikolaj Niewodniczanski, Wysoka (PL); Piotr Zajac, Wroclaw (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/567,983

(22) Filed: Jan. 4, 2022

(65) Prior Publication Data

US 2022/0213963 A1 Jul. 7, 2022

(30) Foreign Application Priority Data

Jan. 4, 2021 (EP) .................................. 21461501

(51) Int. Cl.
| | |
|---|---|
| *F16K 5/06* | (2006.01) |
| *F16K 31/04* | (2006.01) |
| *F16D 1/10* | (2006.01) |

(52) U.S. Cl.
CPC .......... *F16K 5/0694* (2013.01); *F16K 5/0647* (2013.01); *F16K 5/0657* (2013.01); *F16K 31/041* (2013.01); *F16D 2001/103* (2013.01)

(58) Field of Classification Search
CPC .... F16K 5/0694; F16K 5/0657; F16K 31/041; F16K 5/0647; F16D 2001/103; F16D 1/101; C25D 11/026
USPC .............. 251/315.01–315.16, 129.11–129.13
See application file for complete search history.

(56) References Cited

U.S. PATENT DOCUMENTS

| | | | |
|---|---|---|---|
| 3,680,831 A | 8/1972 | Fujiwara | |
| 4,193,541 A * | 3/1980 | Scheidweiler | F23L 13/02 126/285 B |
| 4,357,137 A | 11/1982 | Brown | |
| 4,498,491 A * | 2/1985 | Chamberland | F16K 13/06 137/72 |
| 4,705,063 A | 11/1987 | Robinson | |
| 4,927,403 A | 5/1990 | Pate, Sr. | |
| 5,129,621 A * | 7/1992 | Maiville | F16L 29/002 251/297 |
| 6,186,162 B1 | 2/2001 | Purvis et al. | |

(Continued)

FOREIGN PATENT DOCUMENTS

| | | |
|---|---|---|
| DE | 102007036001 A1 | 2/2009 |
| EP | 0098777 A3 | 1/1984 |

(Continued)

OTHER PUBLICATIONS

DE102007036001A1 Abstract.

(Continued)

*Primary Examiner* — John Bastianelli
(74) *Attorney, Agent, or Firm* — Cantor Colburn LLP

(57) ABSTRACT

A dielectric insulating insert arranged to be positioned between a drive shaft and a ball shaft of a motorised ball valve assembly. The insert includes a body of dielectric material to form an insulating layer and having opposing sides from each of which extends an engagement portion having a non-circular cross-section and configured to engage, respectively, with the drive shaft and the ball shaft in torque transfer engagement.

10 Claims, 4 Drawing Sheets

(56) References Cited

U.S. PATENT DOCUMENTS

| | | |
|---|---|---|
| 8,172,198 B2 | 5/2012 | Dorsey et al. |
| 2008/0041476 A1 | 2/2008 | Campany et al. |
| 2009/0039306 A1 | 2/2009 | Dorsey et al. |
| 2016/0153111 A1 | 6/2016 | Curran et al. |
| 2020/0376635 A1 | 12/2020 | Raskin et al. |

FOREIGN PATENT DOCUMENTS

| | | |
|---|---|---|
| EP | 1054199 B1 | 11/2000 |
| WO | 2020205070 A1 | 10/2020 |

OTHER PUBLICATIONS

EP1054199A1 Abstract (also published as EP1054199B1).
Extended European Search Report for International Application No. 21461501.5 dated Jun. 21, 2021, 7 pages.

* cited by examiner

BALL VALVE ASSEMBLY

CROSS-REFERENCE TO RELATED APPLICATIONS

This application claims priority to European Patent Application No. 21461501.5 filed Jan. 4, 2021, the entire contents of which is incorporated herein by reference.

TECHNICAL FIELD

The present disclosure relates to a ball valve assembly and, in particular, an assembly for a motorised ball valve.

BACKGROUND

Ball valves are valves for controlling flow of a fluid e.g., water. The valve includes a ball shaft having a hole therethrough. The ball shaft is rotatable relative to the fluid flow channel such that when the hole is aligned with the channel, the valve allows fluid flow. To stop flow, the ball shaft is rotated so that the hole is not aligned with the flow. Ball valves can be operated manually e.g., by means of a handle for rotating the ball. Actuated ball valves are operated by a motor which moves the ball shaft between the open and closed positions. Ball valves find use in e.g., sanitation or water systems. One application of a valve moved by an electric motor is in an aircraft water supply system. Aircraft commonly have a water supply system for providing potable water to various outlets e.g., to sinks or wash basins, coffee machines, toilets, etc. One or more valve assemblies is provided in the system for the various outlets and at least some of these are driven by an electric motor so that they can be operated remotely or automatically. Such as a system is described e.g., in U.S. Pat. No. 8,172,198. The use of actuated ball valves is, however, not limited to aircraft water systems and there are many other fields of application for such systems.

Actuated ball valves comprise the motor and drive part, also known as the 'dry' part, and the ball shaft part, which comes into contact with the water, also known as the 'wet' part. Seals need to be provided between the wet part and the dry part to avoid damage to the assembly by water getting to the electric motor.

In aircraft systems and in other water systems, the valve ball shaft often has to be made of metal to satisfy durability and safety standards. Problems may occur with the valve if a fault in the electric motor transmits to the ball shaft due to the conductive path between the various metal parts.

The inventors have identified a need for a dielectric barrier to be provided between the ball shaft and the electric drive part of the valve assembly. There is also a need for a fall-back drive mechanism in the event of failure of the electric drive.

SUMMARY

According to the disclosure, there is provided a dielectric insulating insert arranged to be positioned between a drive shaft and a ball shaft of a motorised ball valve assembly, the insert comprising a body of dielectric material to form an insulating layer and having opposing sides from each of which extends an engagement portion having a non-circular cross-section and configured to engage, respectively, with the drive shaft and the ball shaft in torque transfer engagement.

The engagement portions preferably define a series of lobes.

The insert may include a substrate e.g. of aluminium and an outer adhesive layer which may be formed of an elastic adhesive.

The dielectric material may comprise a plasma electrolytic oxidation, PEO, aluminium layer on the substrate.

According to another aspect, there is provided a ball shaft assembly comprising a ball shaft and an insert as defined above, fitted to the ball shaft.

A motor e.g., an electric motor may be arranged to drive the ball shaft via a cam shaft, the insert located between and in torque transfer engagement with the ball shaft and the cam shaft.

The assembly may further comprise a handle to manually rotate the ball shaft.

The ball shaft may be connected to the cam shaft by means of a keying feature to transmit torque from the motor to the ball shaft.

The assembly may be used in a water supply system, e.g. an aircraft water supply system

BRIEF DESCRIPTION OF THE DRAWINGS

Preferred embodiments will now be described by way of example only, with reference to the drawings in which.

DETAILED DESCRIPTION

Figure 1:
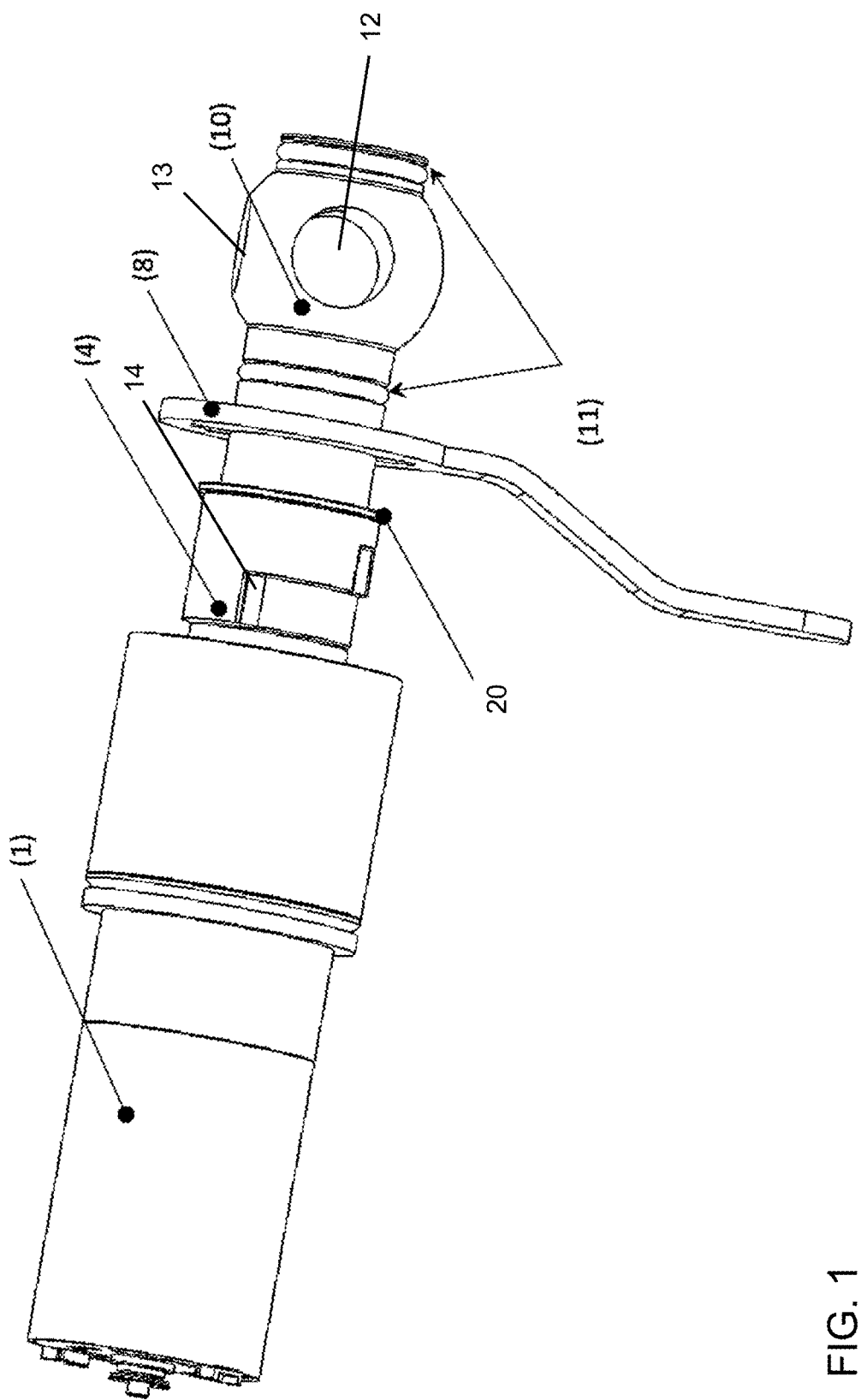
FIG. 1 is a perspective view of a motor driven ball valve assembly according to this disclosure.

FIG. 1 is a perspective view of a motorised ball valve assembly including a dielectric insulation component according to the present disclosure.

The operational part of the valve comprises a ball shaft 10 having a hole 12 therethrough defining a flow passage. In use, the valve is arranged in a water or fluid pipe system such that in a first rotational position of the ball shaft 10, the hole is aligned with a fluid pipe to form a flow passage from the pipe and through the hole 12. To switch off the flow, the ball shaft is rotated e.g. by one quarter turn, so that the hole is no longer aligned with the pipe and, instead, flow from the pipe is blocked by the body 13 of the ball shaft.

Figure 2:
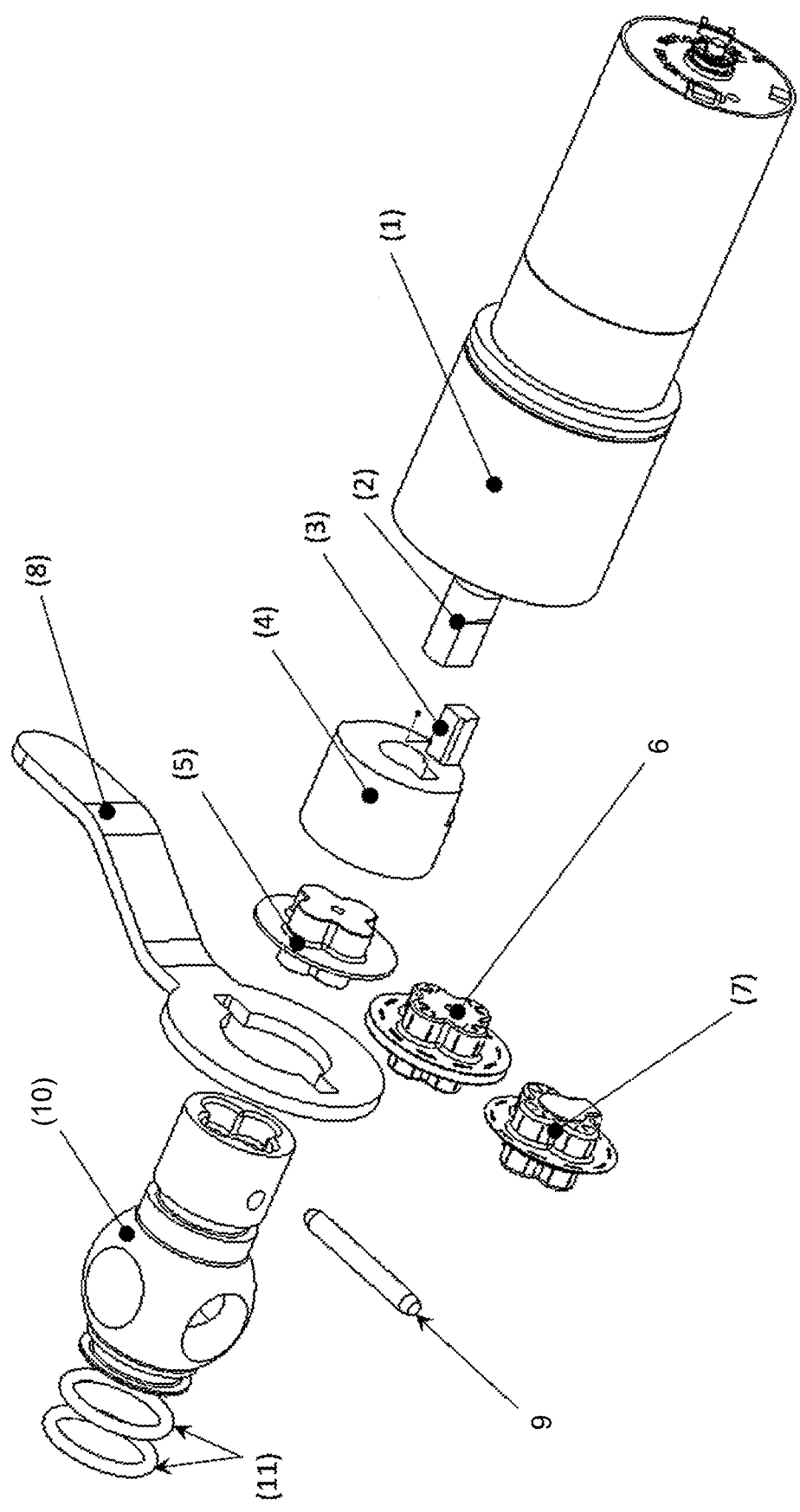
FIG. 2 is an exploded view of the assembly of FIG. 1.
Figure 3:
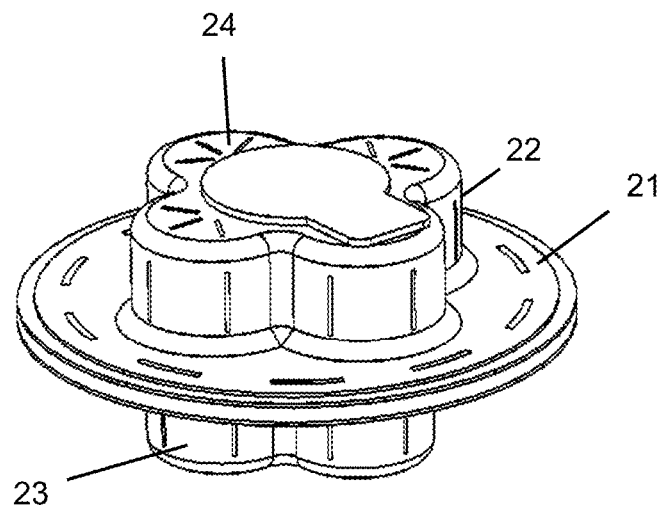
FIG. 3 is a perspective view of a dielectric insulator insert for an assembly in accordance with the disclosure.

In a motorised ball valve, the ball shaft is rotated by means of an electric motor 1. The electric motor 1 drives a cam shaft 4 which engages with the ball shaft 10. In the example shown (see FIG. 2) the cam shaft 4 is provided with a key feature 3 that engages with a D-shaft 2—i.e. a D-shaped shaft component extending from the motor. Rotation of the motor 1 causes rotation of the D-shaft 2 which, in turn, rotates the cam shaft 4 which rotates the ball shaft 10. Seals e.g. O-rings 11 are provided around the ball shaft 10 to prevent water passing into the electric part of the assembly. The cam shaft may be provided with indicators such as microswitches which can be mounted in recesses or races 14 on the cam shaft 4 to provide an indication of the angular position of the shaft. These components are standard for a motorised ball valve such as described in U.S. Pat. No. 8,172,198.

As mentioned above, to provide the required strength and to satisfy other standards such as safety, life and hygiene standards, the various shafts and the key feature will often be made of metal e.g. steel. If there is a problem with the electrics at the motor end of the assembly, these would be transmitted directly to the ball shaft and can cause problems such as electric shocks or arcing. To avoid this problem, the assembly of the present disclosure includes a dielectric insulator insert 20 to be fitted between the ball shaft 10 and the electric motor 1.

The dielectric insulation insert is structured to have dielectric properties and is shaped to provide torque transmission from the electric motor 1 to the ball shaft 10. The shape of the insert should be such as to be able to withstand a short torque peak if the ball shaft end is fixed or blocked. To achieve the torque transfer property, the insert is shaped to define lobes or lugs or ribs or the like that engage into corresponding features provided at the ball shaft and the electric motor. In the example shown, the insert 20 is in the form of a plate 21 from each surface of which extends an engagement portion 22, 23 having a non-circular outer profile. In the example shown, the profile forms rounded lobes 24 but other shapes may also be used. The important thing is that the engagement portion has a shape that can engage with the shafts between which it is located in a manner that torque applied to one of the shafts is transferred to the other shaft via the insert.

In a one embodiment, the shape of the insert will be such that the insert remains centered in position relative to the shafts i.e., so that co-axiality between the shafts and the insert is ensured.

It may also be desired that the insert is designed to minimise or avoid backlash between the shafts. Backlash can result in inaccurate calculations due to small errors introduced at each change of direction. At large power outputs, backlash sends shocks through the whole system and can damage components. To address the problem of backlash, in a preferred embodiment, the dielectric insulation insert is provided with adhesive around the engagement portions. An elastic adhesive layer allows the assembly to accommodate larger manufacturing tolerances, which results in lower production costs since the components do not need to be so precisely manufactured—rather, the adhesive can fill in any small gaps. The adhesive provides a bond between the insert and the shafts which prevents or minimises backlash.

The insert may have dielectric properties. Various dielectric materials are known and can be used. A dielectric that has been found to work particularly well with the insert is formed by a plasma electrolytic oxidation aluminium coating (PEO-aluminium) coating on an aluminium substrate, but this is an example only and other dielectric materials or substances could also be used.

One design of the insert will be described in more detail below.

In the event that the motor fails, there is not only the risk of an electrical fault being transmitted to the wet end of the assembly, but there is also the problem that a motor failure will mean that the ball shaft cannot be rotated. In the event of failure of the motor, it may be necessary to change the position of the ball shaft to switch flow on or off. To address this, a manual handle 8 may be provided in close fitting arrangement around the ball shaft so that manual operation of the handle 8 can rotate the ball shaft 10. The handle 8 can be fitted to the ball shaft such that there is a form fitting or frictional engagement between them. Alternatively, a fixing element e.g. a locking pin 9 may be provided to secure the handle to the shaft.

The dielectric insulation insert of the disclosure, in use, will have one side mounted inside or otherwise fitted to the ball shaft in a manner to transfer torque to the ball shaft 10. The other side of the insert will be fitted into or engaged with the cam shaft 4 for engagement with the motor 1. This can best be seen in FIG. 5.

Figure 5:
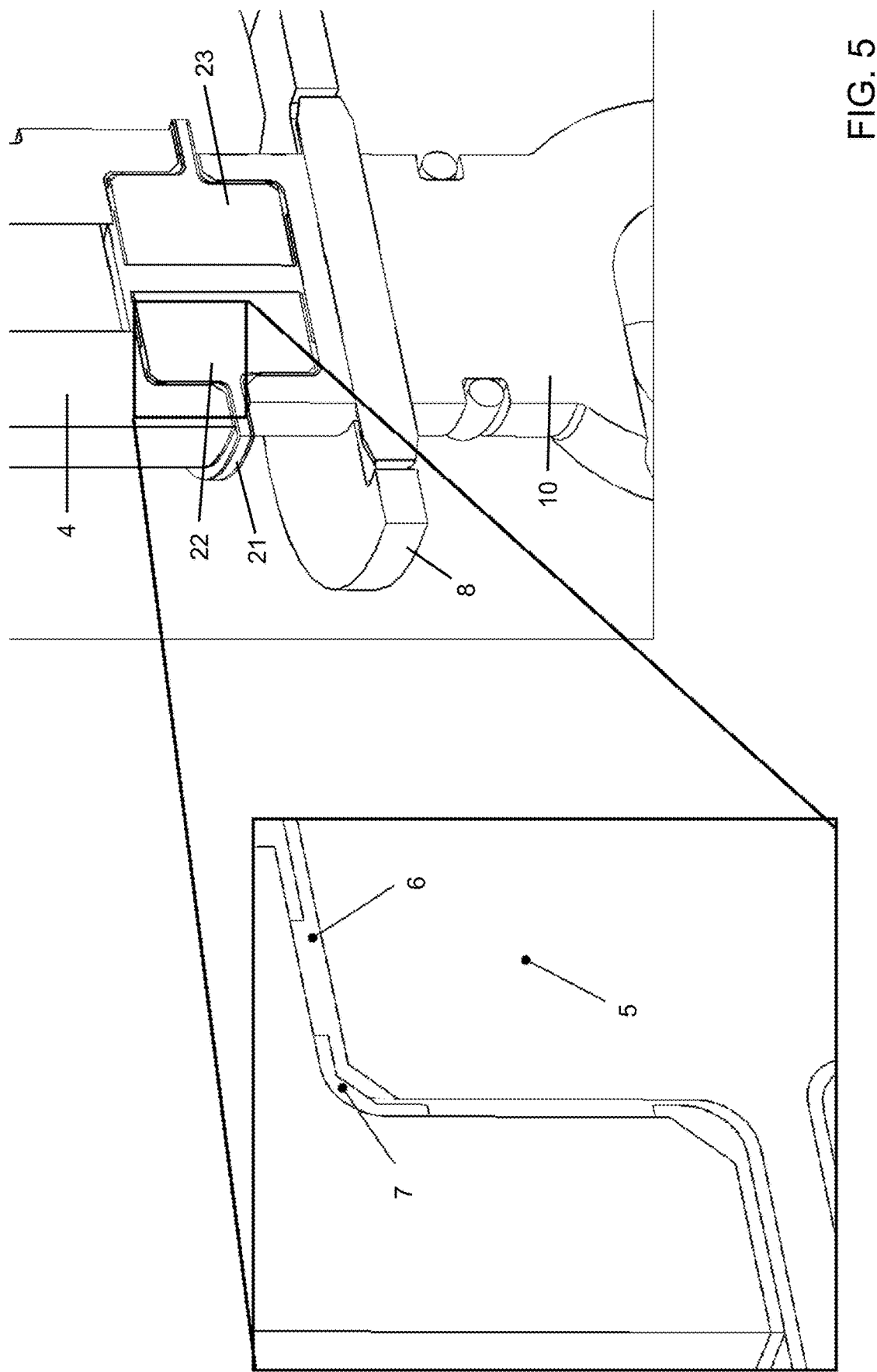
FIG. 5 is a sectional view of an assembly incorporating a dielectric insulator insert according to the disclosure.

The one embodiment structure of the insert, as will be described in more detail below, can be seen in situ in the enlarged detail of FIG. 5. The inner part of the insert is a substrate, preferably an aluminium substrate 5 for greater strength, over which is formed the dielectric PEO-aluminium layer 6 (or other dielectric coating). The adhesive bond layer 7 is then formed over the insert as an outer layer to provide an adhesive bond with the cam and ball shafts. While aluminium and PEO-aluminium have particular advantages, other substrate and dielectric materials can be used.

Figure 4:
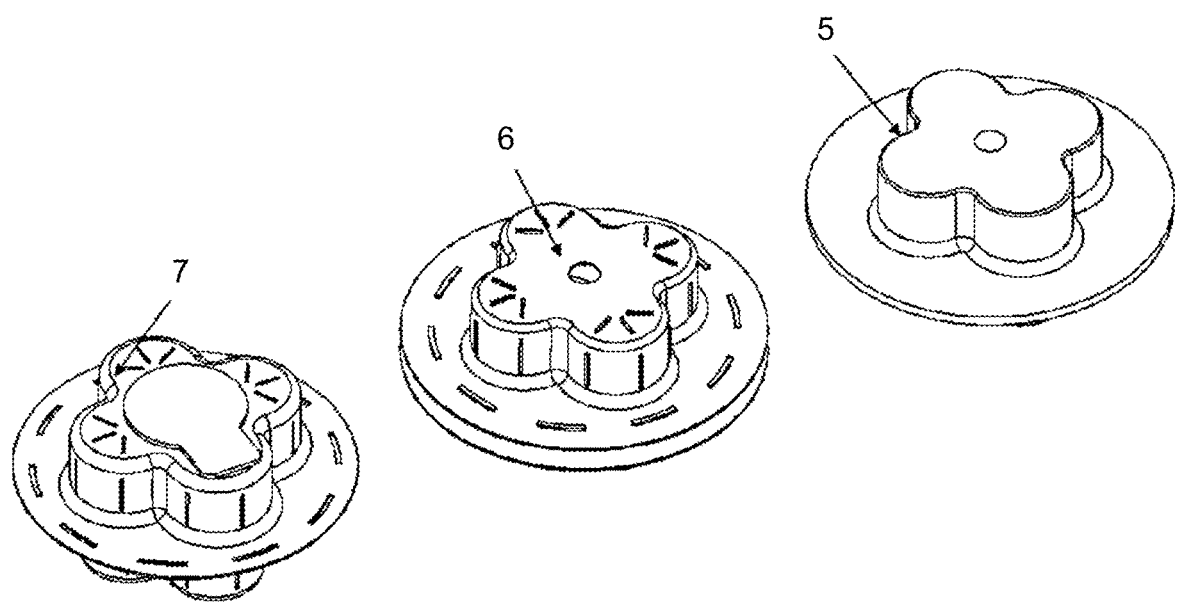
FIG. 4 shows individual components assembled to form the insert of FIG. 3.

FIG. 4 shows the component parts of the insert in the preferred embodiment. As described above in relation to FIG. 5, a substrate is first formed having the shape required for the torque transfer fitting as described above. A plasma electrolytic oxidation coating 6 is then formed on the substrate 5. A glue or adhesive bond layer 7 is then formed as the outer layer. This results in an integral unit forming the insert 20 that can then be fitted into place between the shafts. The thickness of the PEO coating should be such as to provide sufficient electrical insulation. PEO-aluminium coating has a dielectric strength ranging from 14.6-16.7 kV/mm. A thickness of around 300 micrometers was found to provide good insulation against voltage of 4.4 kV to 5 kV. The use of a PEO coating was found to provide high electrical resistivity and high dielectric strength.

The dielectric insulation insert provides electrical insulation between the dry and wet parts of the motorised ball valve assembly whilst ensuring torque transfer between the shafts of the respective parts. An adhesive layer as the outer layer of the insert ensures secure coaxial location of the insert and prevents or minimises backlash and damps vibrations. The coaxial location and the adhesive help in reducing component wear. The use of an elastic adhesive can also accommodate greater manufacturing tolerances. The use of an aluminium substrate provide superior strength properties.

The invention claimed is:

1. A dielectric insulating insert arranged to be positioned between a drive shaft and a ball shaft of a motorised ball valve assembly, the insert comprising:
   a substrate having opposing sides from each of which extends an engagement portion having a non-circular cross-section and configured to engage, respectively, with the drive shaft and the ball shaft in torque transfer engagement, wherein the engagement portions define a series of lobes;
   a dielectric layer formed on the substrate; and
   an outer adhesive layer formed on over the dielectric layer on the engagement portions.

2. The insert of claim 1, wherein the outer adhesive layer is formed of an elastic adhesive.

3. The insert of claim 1, wherein the substrate comprises aluminium.

4. The insert of claim 3, wherein the dielectric material comprises a plasma electrolytic oxidation (PEO) aluminium layer on the substrate.

5. A ball shaft assembly comprising:
a ball shaft; and
an insert as claimed in claim 1 fitted to the ball shaft.

6. The assembly of claim 5, further comprising:
a motor arranged to drive the ball shaft via the drive shaft, the insert located between and in torque transfer engagement with the ball shaft and the drive shaft.

7. The assembly of claim 6, further comprising:
a handle to manually rotate the ball shaft.

8. The assembly of claim 6, wherein the motor is an electric motor.

9. A water supply system comprising:
a ball shaft assembly comprising:
a ball shaft; and
an insert as claimed in claim 1 fitted to the ball shaft.

10. The water supply system of claim 9, being an aircraft water supply system.

* * * * *